Patented Aug. 15, 1950

2,518,475

UNITED STATES PATENT OFFICE 2,518,475

MEROCYANINE DYESTUFFS

John David Kendall and Frank Peter Doyle, Ilford, England, assignors to Ilford Limited, Ilford, England, a British company No Drawing. Application June 3, 1948, Serial No. 30,975. In Great Britain June 4, 1947

6 Claims. (Cl. 260—240.1)

This invention relates to merocyanine dyestuffs.

In co-pending application Ser. No. 30,979 filed on even date herewith dyestuffs which are also intermediates for dyestuffs are prepared by reacting a merocyanine dye of the general Formula I:

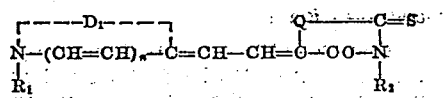

wherein $R_1$ is an alkyl, hydroxyalkyl, aralkyl or hydroxyaralkyl group, $R_2$ is a hydrogen atom or a hydrocarbon group, $D_1$ is the residue of a five-membered or six-membered heterocyclic nitrogen ring, Q is an oxygen atom or a sulphur atom, and $n$ is nought or one, with an acid HX where X is the acid anion and a trithio-orthoformate $HC(SR_3)_3$ where $R_3$ is an alkyl or aralkyl group, the reaction being effected in the presence of a carboxylic acid or anhydride which is a solvent for the reacting materials.

The product of the reaction is believed to be a compound of the general Formula II:

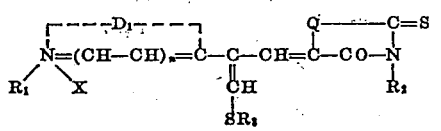

Where in the original material the group $R_1$ contains a hydroxy group, this may be acylated under the conditions of the reaction.

The group $R_1$ is preferably a lower alkyl or hydroxyalkyl group, e. g. methyl, ethyl or propyl group, or the corresponding hydroxyalkyl group, e. g. β-hydroxyethyl.

It is stated that since the product of the invention is intended to be used for further condensations which result in the removal of the group $SR_3$, the nature of $R_3$ is not of special importance. For the sake of convenience, however, it may be ethyl, in which case the reagent employed is triethyl trithio-orthoformate which is the most readily obtainable compound of the series. However, it is disclosed that it may be any other alkyl group or aralkyl group, e. g. tribenzyl trithio-orthoformate.

The acid HX may be any strong acid, but the hydrohalic acids, e. g. HCl and Hbr, and p-toluene sulphonic acid, are preferred. The solvent acid or anhydride is preferably a weak acid, e. g. acetic acid or acetic anhydride.

The reaction should be effected under substantially anhydrous conditions, i. e. in the absence of any hydrolytic substance, and is best effected by heating the reagents together.

The residue $D_1$ may be selected from the residues of thiazoles, oxazoles, selenazoles and their polycyclic homologues, such as those of the benzene, naphthalene, acenaphthene and anthracene series, pyridine and its polycyclic homologues such as quinoline and α and β naphthaquinolines, lepidines, indolenines, diazines, such as pyrimidines and quinazolines, diazoles (e. g. thio-β,β'-diazole), oxazolines, thiazolines and selenazolines. The polycyclic compounds of this series may also be substituted in the carbocyclic rings with one or more groups such as alkyl, aryl, amino, hydroxy, alkoxy and methylenedioxy groups, or by halogen atoms.

According to the present invention trinuclear polymethine merocyanine dyestuffs are obtained by reacting a compound of general Formula II with a heterocyclic nitrogen compound containing a reactive methylene group. Such compounds may be (a) compounds of the general Formula III:

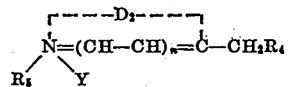

where $D_2$ is the residue of a five-membered or six-membered heterocyclic nitrogen compound, $R_4$ is a hydrogen atom or a hydrocarbon group, $R_5$ is an alkyl, aralkyl, hydroxyalkyl or hydroxyaralkyl group and Y is an acid radicle, and the corresponding methylene bases of the general Formula IV:

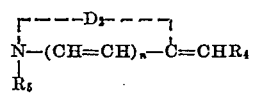

(b) compounds of the general Formula V:

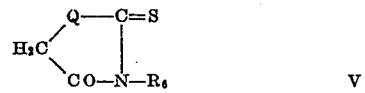

where Q is an oxygen atom or a sulphur atom and $R_6$ is a hydrogen atom or a hydrocarbon group.

The products obtained by the use of compounds of type (a) have the general Formula VI:

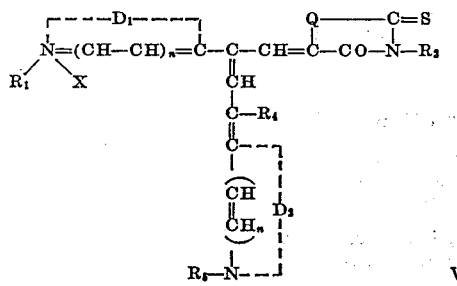

The products obtained by the use of compounds of type (b) have the general Formula VII:

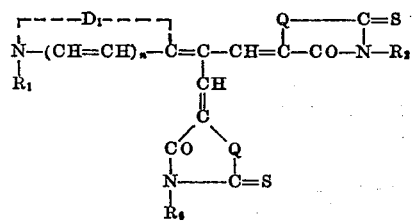

Compounds of type (a) which may be employed may be any of those which have been used or proposed for use in the many processes for the production of cyanine and similar dyestuffs, for example, thiazoles, oxazoles, selenazoles and their polycyclic homologues such as those of the benzene, naphthalene, acenaphthene and anthracene series; pyridine and its polycyclic homologues such as quinoline and α and β naphthaquinolines; lepidines; indolenines, diazines, such as pyrimidines and quinazolines; diazoles (e. g. thio-ββ'-diazole); oxazolines, thiazolines and selenazolines. The polycyclic compounds of these series may also be substituted in the carbocyclic rings with one or more groups such as alkyl, aryl, amino, hydroxy, alkoxy and methylene-dioxy groups, or by hologen atoms.

Compounds of type (b) which may be employed are rhodanic acid and oxarhodanic acid and the N-hydrocarbon substitution derivatives of these compounds.

The formation of the dyestuffs is readily effected by heating the reagents together in the presence of a solvent and a base, e. g. pyridine, piperidine, diethylamine, triethylamine and triethanolamine, or an inorganic base such as a solution of sodium or sodium acetate in ethyl alcohol.

Where the dyestuff is obtained in the form of a sulphate or an alkyl-p-toluene sulphonate, it may be converted to a salt of another acid by treatment with a solution of an alkali salt of such other acid, e. g. potassium chloride, potassium bromide or potassium iodide.

The following examples, in which the parts are by weight, serve to illustrate this invention:

EXAMPLE 1

*Preparation of [2-(3-ethyl-benzthiazole)-5'-(3-ethyl - 2 - thio - 4 - keto - tetrahydrothiazole) - γ.2''-(1-ethyl quinoline) tetramethine merocyanine] iodide*

1 - ethylthio - 2 - α - quinolyl - 3 - [3' - ethyl-2' - thio - 4'-keto-tetrahydrothiazolylidene] propene ethiodide (5 parts) (prepared as in Example 2 of Ser. No. 30,979 filed on even date herewith, and 2-methyl benzthiazole ethiodide (3 parts) were boiled together in pyridine (100 parts) for ten minutes. The blue solution was then poured into water, cooled and diluted, the precipitated dyestuff being removed by filtration and washed. Crystallisation from methyl alcohol gave tiny blue crystals, M. Pt. 216° (with decomposition) of a dye having the following structural formula:

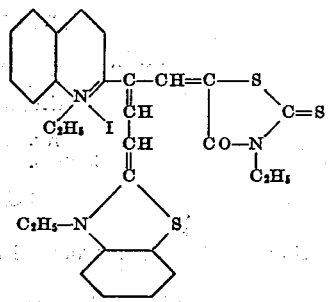

EXAMPLE 2

*Preparation of [2-(3-ethyl-benzthiazole)-5'-(3-ethyl - 2 - thio - 4 - keto - tetrahydrothiazole) - γ.2''(133-trimethyl indolenine) tetramethine merocyanine] iodide*

1 - ethylthio - 2 - (3'3' - dimethyl indolenyl) -3- (3' - ethyl - 2' - thio - 4' - keto - tetrahydrothiazolylidene) propene metho-p-toluene sulphonate (prepared as in Example 4 of Ser. No. 30,979 filed on even date herewith), was reacted with 2-methyl benzthiazole ethiodide as in Example 1. The product, after boiling out with benzene, gave a dark green powder, M. Pt. 240° (with decomposition). This product was a dye having the following structural formula:

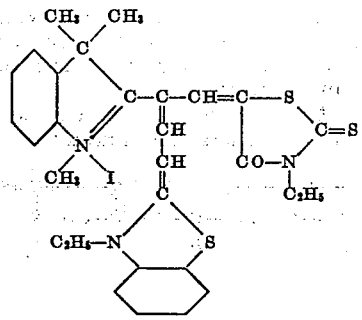

EXAMPLE 3

*Preparation of [2(3-ethyl-benzthiazole)-5'-(3-methyl - 2 - thio - 4 - keto - tetrahydrothiazole) - γ.2''(3 - ethyl benzoxazole) tetramethine merocyanine] iodide*

1 - ethylthio - 2 - benzoxazolyl - 3(3' - methyl-2' - thio - 4' - keto - tetrahydrothiazolylidene) - propene ethiodide (prepared as in Example 5 of Ser. No. 30,979 filed on even date herewith) was reacted with 2-methyl benzthiazole ethiodide as in Example 1. The product, after boiling out with benzene, gave dark purple needles, M. Pt. 280° (with decomposition) of a dye having the following structural formula:

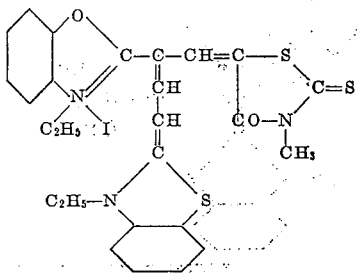

EXAMPLE 4

*Preparation of [2-(1-ethyl quinolino)-5'-(3-ethyl - 2 - thio - 4 - keto - tetrahydrothiazole)-γ,2''-(1-ethyl quinoline) tetramethine cyanine] iodide*

This dyestuff was prepared from the intermediate of Example 2 of Ser. No. 30,979 filed on even date herewith (the crude p-toluene sulphonate being used before conversion to the iodide) by reaction with quinoline ethiodide as in Example 1. The dyestuff was isolated as green crystals with a gold reflex, M. Pt. 204° (with decomposition) and had the following structural formula:

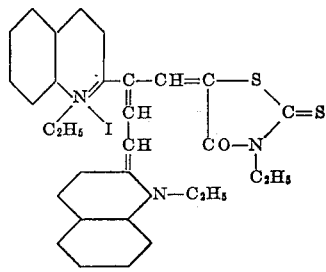

EXAMPLE 5

*Preparation of bis - 5 - (3 - ethyl - 2 - thio - 4-keto-tetrahydrothiazole) - β-2'(1 - ethyl - dihydro-quinoline)-trimethine merocyanine*

This was prepared by the reaction of the intermediate of Example 2 of Ser. No. 30,979 filed on even date herewith (the p-toluene sulphonate salt being used directly) with 3-ethyl-2-thio-4-keto-tetrahydrothiazole as in Example 1. The dyestuff was isolated as dark brown crystals, M. Pt. 273° (with decomposition) and had the following structural formula:

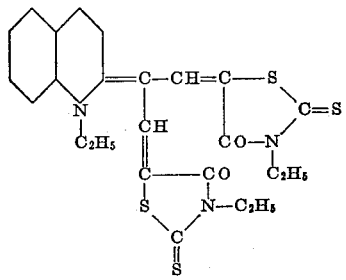

What we claim is:

1. Process for the production of trinuclear polymethine merocyanine dyestuffs which comprises reacting a compound of general formula:

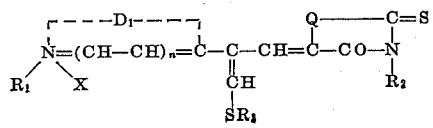

where $R_1$ is selected from the class consisting of alkyl, hydroxyalkyl, acyloxyalkyl, aralkyl, hydroxyaralkyl and acyloxyaralkl groups, $R_2$ is selected from the class consisting of the hydrogen atom and hydrocarbon groups, $R_3$ is selected from the class consisting of alkyl and aralkyl groups, X is an acid radicle, Q is selected from the class consisting of oxygen and sulphur atoms, $n$ is selected from nought and one and $D_1$ is a residue of a nucleus selected from the class consisting of five-membered and six-membered heterocyclic nitrogen nuclei, with a heterocyclic nitrogen compound containing a reactive methylene group.

2. Process for the production of trinuclear polymethine merocyanine dyestuffs which comprises reacting a compound of general formula:

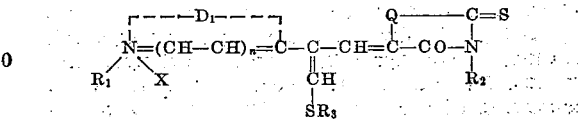

where $R_1$ is selected from the class consisting of alkyl, hydroxyalkyl, acyloxyalkyl, aralkyl, hydroxyaralkyl and acyloxyaralkl groups, $R_2$ is selected from the class consisting of the hdrogen atom and hydrocarbon groups, $R_3$ is selected from the class consisting of alkyl and aralkyl groups, X is an acid radicle, Q is selected from the class consisting of oxygen and sulphur atoms, $n$ is selected from nought and one, and $D_1$ is a residue of a nucleus selected from the class consisting of five-membered and six-membered heterocyclic nitrogen nuclei, with a compound selected from the class consisting of quaternary salts of the general formula:

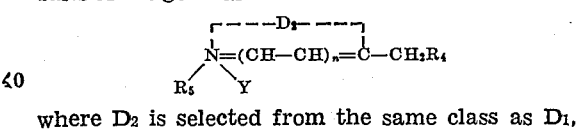

where $D_2$ is selected from the same class as $D_1$, $R_4$ is selected from the same class as $R_2$, $R_5$ is selected from the same class as $R_1$, $n$ is selected from nought and one and Y is an acid radicle, and the corresponding methylene bases.

3. Process for the production of trinuclear polymethine merocyanine dyestuffs which comprises reacting a compound of general formula:

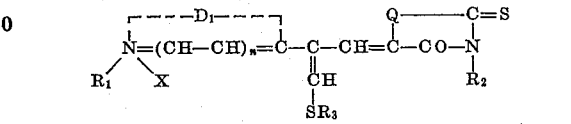

where $R_1$ is selected from the class consisting of alkyl, hydroxyalkyl, acyloxyalkyl, aralkyl, hydroxyaralkyl and acyloxyaralkyl groups, $R_2$ is selected from the class consisting of the hydrogen atom and hydrocarbon groups, $R_3$ is selected from the class consisting of alkyl and aralkyl groups, X is an acid radicle, Q is selected from the class consisting of oxygen and sulphur atoms, $n$ is selected from nought and one and $D_1$ is a residue of a nucleus selected from the class consisting of five-membered and six-membered heterocyclic nitrogen nuclei, with a compound of the general formula:

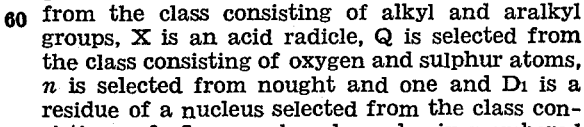

where Q is selected from the class consisting of the oxygen atom and the sulphur atom and $R_6$ is selected from the class consisting of the hydrogen atom and hydrocarbon groups.

4. Process according to claim 1 wherein the reaction is effected by heating the reagents together in the presence of a base.

5. A dyestuff of the general formula:

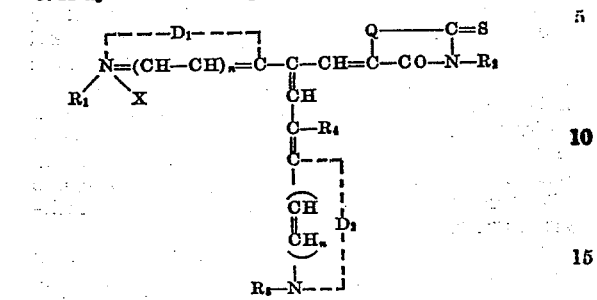

where $R_1$ and $R_5$ are each selected from the class consisting of alkyl, hydroxyalkyl, acyloxyalkyl, aralkyl, hydroxyaralkyl and acyloxyaralkyl groups, $R_2$ and $R_4$ are selected from the class consisting of the hydrogen atom and hydrocarbon groups, Q is selected from the class consisting of oxygen and sulphur atoms, $n$ is selected from nought and one, X is an acid radicle and $D_1$ and $D_2$ are each a residue of a nucleus selected from the class consisting of five-membered and six-membered heterocyclic nitrogen nuclei.

6. The dye of the formula:

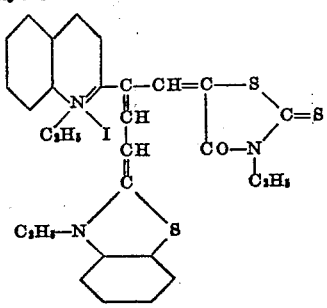

JOHN DAVID KENDALL.
FRANK PETER DOYLE.

REFERENCES CITED

The following references are of record in the file of this patent:

UNITED STATES PATENTS

| Number | Name | Date |
|---|---|---|
| 2,385,815 | Kendall | Oct. 2, 1945 |
| 2,397,013 | Kendall | Mar. 19, 1946 |

FOREIGN PATENTS

| Number | Country | Date |
|---|---|---|
| 549,202 | Great Britain | 1942 |